No. 675,709. Patented June 4, 1901.
J. BLUM.
CLUTCH AND REVERSING MECHANISM.
(Application filed Mar. 9, 1901.)
(No Model.)
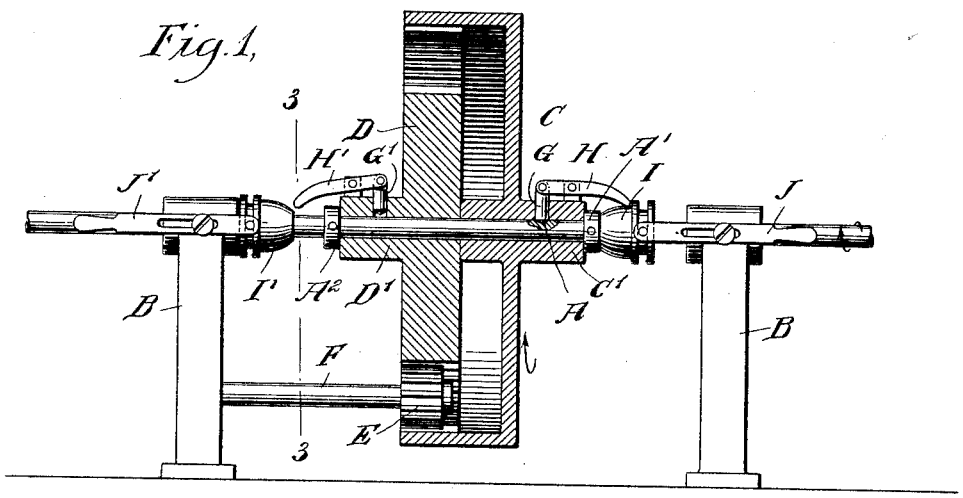
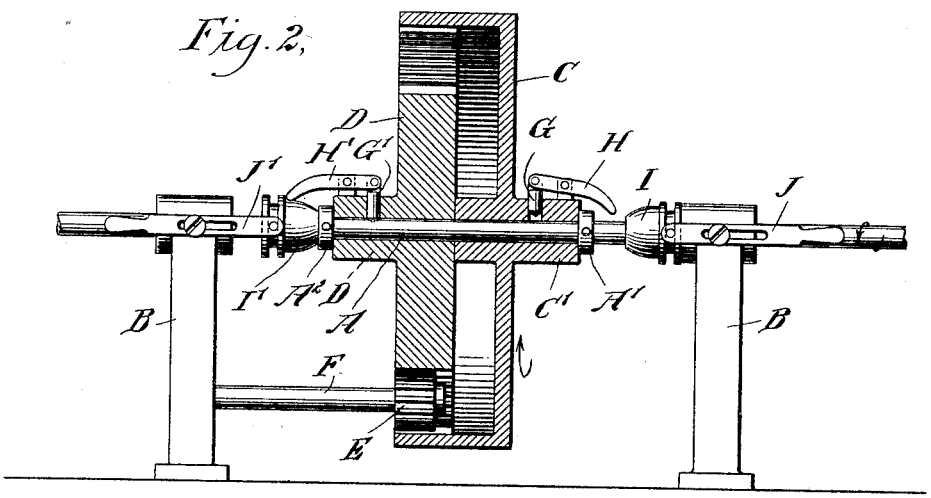
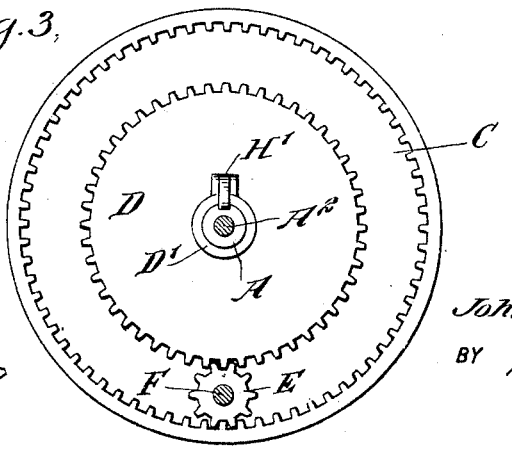
WITNESSES:
Edward Thorpe
INVENTOR
John Blum.
BY
ATTORNEYS

UNITED STATES PATENT OFFICE.

JOHN BLUM, OF WEST HOBOKEN, NEW JERSEY, ASSIGNOR OF ONE-HALF TO WILLIAM J. HOPKINS, OF CATASAUQUA, PENNSYLVANIA.

CLUTCH AND REVERSING MECHANISM.

SPECIFICATION forming part of Letters Patent No. 675,709, dated June 4, 1901.

Application filed March 9, 1901. Serial No. 50,456. (No model.)

*To all whom it may concern:*

Be it known that I, JOHN BLUM, a citizen of the United States, and a resident of West Hoboken, in the county of Hudson and State of New Jersey, have invented a new and Improved Clutch and Reversing Mechanism, of which the following is a full, clear, and exact description.

The object of the invention is to provide a new and improved clutch and reversing mechanism which is simple and durable in construction, very effective in operation, and arranged to permit the operator to readily cause the shaft to be driven in either direction or to be stopped whenever desired.

The invention consists of novel features and parts and combinations of the same, as will be fully described hereinafter and then pointed out in the claim.

A practical embodiment of the invention is represented in the accompanying drawings, forming a part of this specification, in which similar characters of reference indicate corresponding parts in all the views.

Figure 1 is a longitudinal sectional elevation of the improvement. Fig. 2 is a like view of the same with parts in a reversed position, and Fig. 3 is a transverse section of the same on the line 3 3 in Fig. 1.

The shaft A to be driven is journaled in suitable bearings B, and on the said shaft are mounted loosely gear-wheels C and D, of which the gear-wheel C is an internal gear-wheel and the other gear-wheel D is an external one, and both gear-wheels are in mesh with a pinion E, secured on a driven shaft F, journaled in suitable bearings and connected with other machinery for imparting a continuous rotary motion to said shaft and its pinion E. When the pinion is driven, the two gear-wheels D and C are simultaneously rotated, but in opposite directions, and when either of said gear-wheels is locked to the shaft A it is evident that the latter is driven in the direction in which the corresponding gear-wheel C or D rotates.

In order to lock either the gear-wheel C or D to the shaft A, similar clutch mechanisms are provided, but arranged completely independent of one another, as is plainly illustrated in the drawings.

On the hubs C' and D' of the gear-wheels C and D are mounted to slide radially pins G G', adapted to engage the shaft A, so as to lock the corresponding hub to the shaft A when a pin is forced inward in frictional contact with the said shaft. The outer ends of the pins G G' are pivotally connected with levers H H', formed on the hubs C' D', respectively, and the free ends of said levers H H' are adapted to be engaged by cones I I', mounted to slide loosely on the shaft A and engaged by independent shifting-arms J J', mounted to slide on the bearings B, said shifting-arms being under the control of the operator, so that either of the cones I or I' can be moved in or out of engagement with the corresponding lever H or H'.

As shown in Fig. 1, the cone I has been moved inward in engagement with the free end of the lever H, so that the latter presses the pin G in contact with the shaft A to lock the gear-wheel C to the shaft A. Now as the gear-wheel C rotates it imparts a rotary motion to the shaft A in one direction. When the cone I is out of engagement with its lever H and the cone I' is moved in engagement with its lever H', as shown in Fig. 2, then the pin G' locks the gear-wheel D to the shaft A, so that the latter is rotated in an opposite direction, owing to the movement of the gear-wheel D, driven by the pinion E.

From the foregoing it is evident that the operator can readily move both cones I I' out of engagement with their levers H H', so that the gear-wheels C and D rotate loosely on the shaft A without driving the latter, and consequently the shaft A remains at a standstill. When it is desired to drive the shaft in an opposite direction, the cone I is moved out of engagement with the lever H and the cone I' is moved in engagement with the lever H', so that the gear-wheel D now drives the shaft A in the reverse direction.

The outer ends of the hubs C' and B' abut against collars A' A² on the shaft A, and the inner ends of the hubs abut one upon the other, so that the gear-wheels C and D are held against longitudinal movement on the shaft A to insure proper meshing of the pinion E with both gear-wheels C and D.

Having thus described my invention, I claim as new and desire to secure by Letters Patent—

A mechanism of the class described, comprising a shaft to be driven, an internal gear-wheel, an external gear-wheel, both gear-wheels being loose on said shaft, a driven pinion in mesh with both gear-wheels, and independent clutch mechanisms one for each gear-wheel, to lock either of the gear-wheels to said shaft to be driven, each clutch mechanism comprising a pin slidable on the hub of the corresponding gear-wheel, and arranged to lock said hub to said shaft to be driven, a lever carrying said pin and fulcrumed on the gear-wheel hub, a cone slidable on the shaft and adapted to engage the free end of said lever, and means for shifting the cone longitudinally on said shaft, to move the cone in or out of contact with the free end of said lever, as set forth.

In testimony whereof I have signed my name to this specification in the presence of two subscribing witnesses.

JOHN BLUM.

Witnesses:
 EVERARD BOLTON MARSHALL,
 F. W. HANAFORD.